United States Patent [19]

Itagaki et al.

[11] 4,349,962
[45] Sep. 21, 1982

[54] CUTTING DOWN MACHINE

[75] Inventors: Hidehiko Itagaki, Kasukabe; Yuji Suzuki, Akishima, both of Japan

[73] Assignee: Komatsu Zenoah Co., Japan

[21] Appl. No.: 171,789

[22] Filed: Jul. 24, 1980

[30] Foreign Application Priority Data

Jun. 14, 1980 [JP] Japan .................................. 55-79620

[51] Int. Cl.³ .......................... A01G 3/00; A01D 50/00
[52] U.S. Cl. ..................................................... 30/276
[58] Field of Search .................... 30/276, 347; 56/12.7

[56] References Cited

U.S. PATENT DOCUMENTS 4,161,820 7/1979 Moore .................................. 30/276
4,183,138 1/1980 Mitchell ............................... 30/276

*Primary Examiner*—Jimmy C. Peters
*Attorney, Agent, or Firm*—Jones & Askew

[57] ABSTRACT

Line trimmer apparatus for cutting down weeds or the like, incorporating a device for selectably extending a predetermined length of cutting line or tape while the apparatus is operating. The tape is wound on a reel axially and rotatably fitted relative to a drive shaft. Protrusions on the reel mate with either of two sets of engaging portions on a cover portion driven by the drive shaft. The reel is axially urged to a first engaging position by a spring, and has a pressing member which can be placed against the ground to urge the reel axially to a second engaging position. The two sets of engaging portions are angularly offset relative to each other, allowing the protrusions on the reel to rotate relative to the cover portion when axially moved between the engaging positions and thereby unwinding a predetermined length of the cutting tape.

7 Claims, 10 Drawing Figures

CUTTING DOWN MACHINE

TECHNICAL FIELD

The present invention relates to a cutting down machine for carrying out the cutting down work of weeds and the like by a cutting tape extending outward and radially of a case which is rotatably driven through a rotating shaft by a prime mover.

BACKGROUND OF THE INVENTION

In the cutting down machine of such type, in order to deliver a cutting down tape an end portion of which is worn and broken by the cutting down operation, the rotation of the cutting down machine was stopped and the engagement of a reel on which the cutting down tape is wound and accommodated was released to grasp the end of the cutting tape and draw out a suitable length of the cutting tape. Therefore, the drawing out work during operation is considerably troublesome, causing the obstacle in the working efficiency. The present invention overcomes this disadvantage.

SUMMARY OF THE INVENTION

The present invention relates to a cutting down machine for cutting down weeds and the like by means of a cutting tape or string extending outward and radially of a case rotatably driven through a rotating shaft by a prime mover. In this cutting down machine, in order to deliver an end portion broken and worn cutting tape through the cutting operation, the cutting down machine was stopped rotating, the engagement of a reel on which the cutting tape is wound and accommodated was released and the end of the cutting tape was grasped to draw out to a suitable length. Therefore, the operation for delivering the cutting tape during working was considerably troublesome, causing the difficulty in the working efficiency. The present invention is proposed in order to overcome this drawback and comprises a rotating shaft, a case fixed to the rotating shaft, a reel provided rotatably relative to and in the case and supported axially pivotally, engaging portions disposed in the confronting upper and lower internal side surfaces of the case, and engageable protruding portions with the upper and the lower engaging portion of the case provided in the reel, wherein the upper and the lower engaging positions of this reel are disposed with their phases being different from each other, and a lower portion of the reel is protruded downward of the case.

DETAILED DESCRIPTION OF THE PREFERRED EMBODIMENT

The present invention overcomes the above mentioned conventional problems effectively.

Thus, a primary object of the present invention is to provide a cutting down machine capable of delivering a predetermined length of a cutting tape successively without stopping the rotation of the cutting machine.

A second object of the present invention is to provide a cutting down machine in which breaks or wears and the like of an engaging portion and an engaging protrusion can be extremely decreased by providing an engaging portion of the case and an engaging protrusion of the reel in a position near to an outer circumference of the reel in a position near to an outer circumference of the reel and making small load exerted on the engaging portion and the engaging protrusion.

A third object of the present invention is to provide a cutting down machine capable of useless consumption of the cutting tape by providing an engaging protrusion in the vicinity of an outer circumference of the reel, thereby the number of the engaging protrusion being increased and the amount of the delivery of the cutting tape being decreased.

The present invention proposes a cutting down machine, in order to accomplish the above mentioned objects, comprising a rotating shaft, a case fixed to the rotating shaft, a reel rotatably provided relative to and in the case and axially pivotally supported, engaging portions respectively disposed in confronting upper and lower inner side surfaces of the case, and engaging protrusions engageable with said upper and lower engaging portions provided in the reel, the upper and lower engaging positions of the reel being disposed with their phases made different from each other, and a lower portion of said reel being protruded downward of the case.

Figure 1:
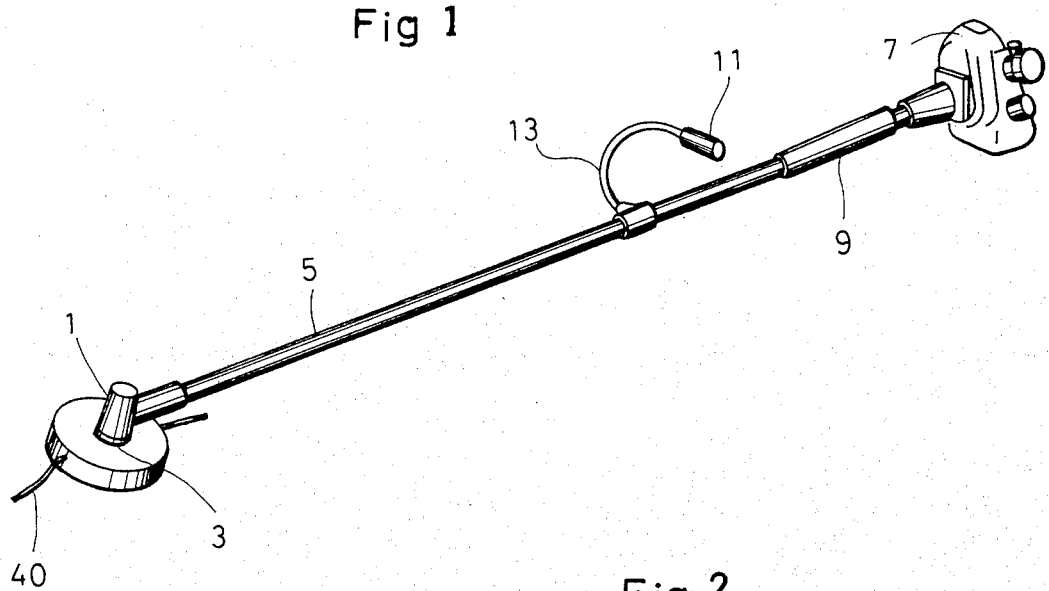
Figure 2:
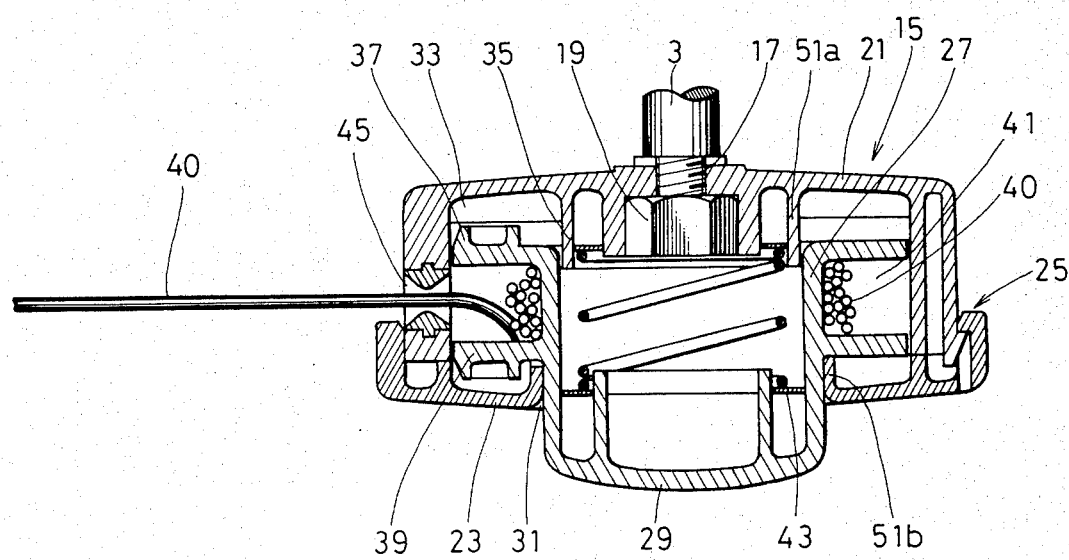
Figure 3:
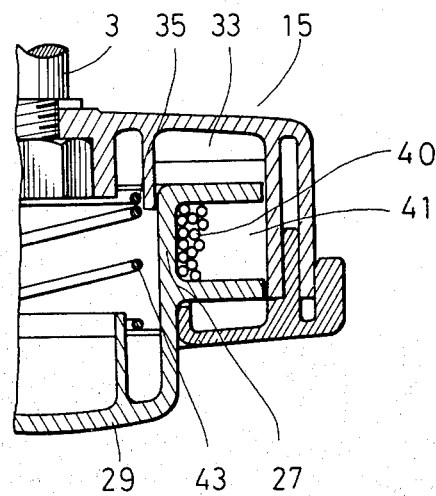
Figure 4:
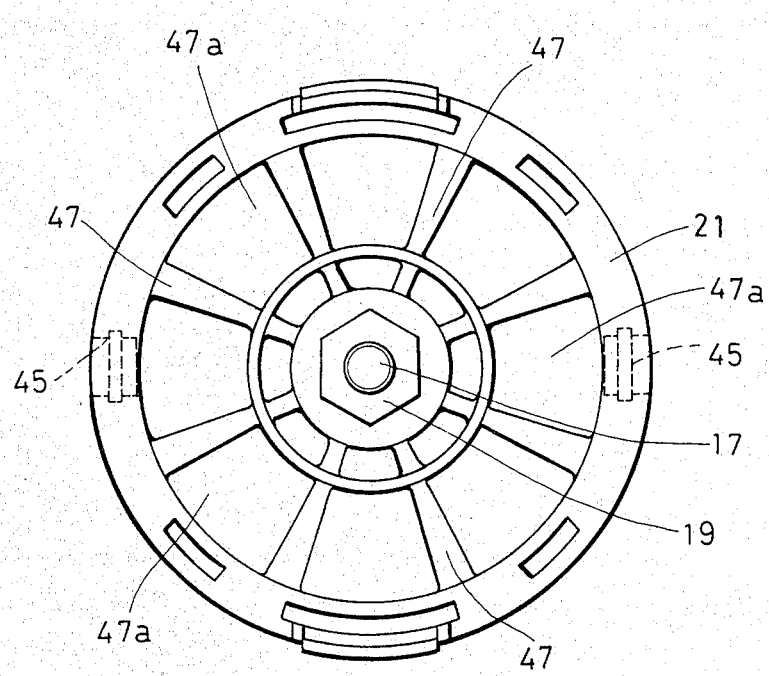
Figure 5:
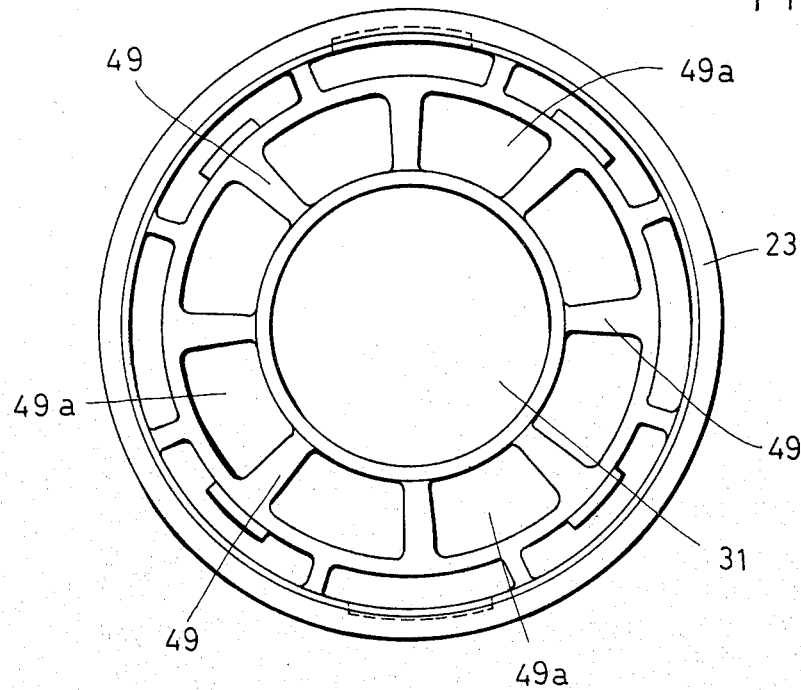
Figure 6:
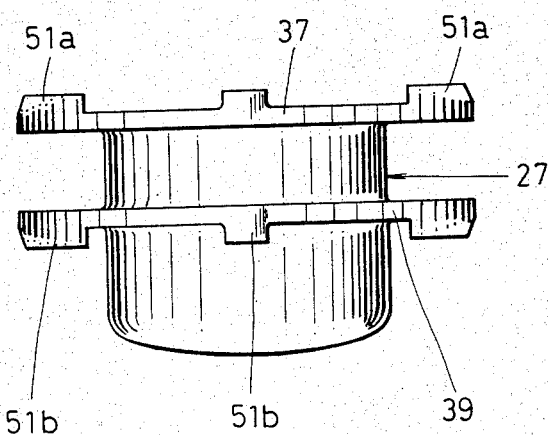
Figure 7:
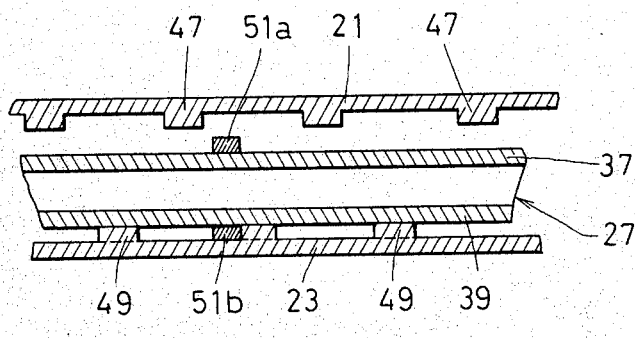
Figure 8:
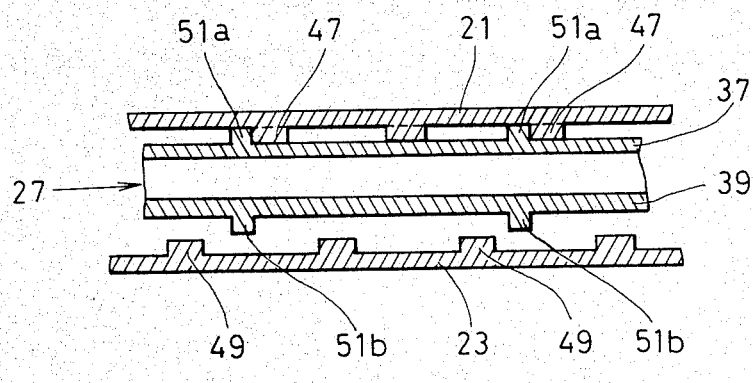
Figure 9:
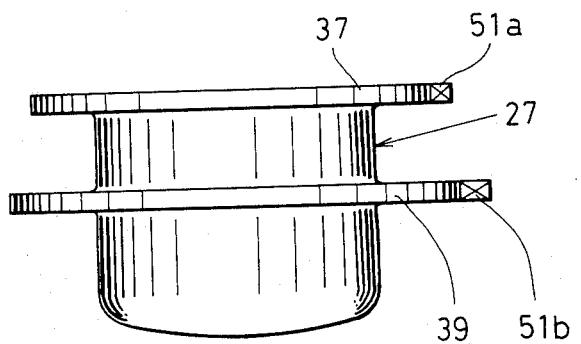
Figure 10:
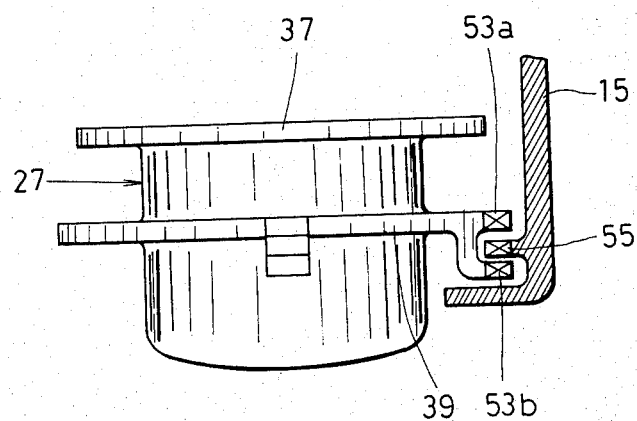

FIG. 1 is a perspective view of a cutting down machine embodying the present invention, FIG. 2 is an enlarged longitudinally sectional view of an inner portion of the case, FIG. 3 is a partial longitudinal sectional view showing an engaging portion of a case body and a cover portion, FIG. 4 is a bottom view of a case body, FIG. 5 is a plan view of a cover portion, FIG. 6 is a front view of a reel, FIGS. 7 and 8 are explanatory views showing the engaging conditions of an engaging portion and an engaging protrusion, and FIGS. 9 and 10 are explanatory views showing a second example and a third example of the engaging protrusion of the reel.

In the accompanying drawings, a reference numeral 1 designates a supporting case bearing rotatably a rotating shaft 3. A reference numeral 5 designates a connecting pipe connecting the supporting case 1 and an engine 7 and a transmission shaft (not shown) passes therethrough and is rotatably born to transmit power of the engine to the rotating shaft 3. A reference numeral 9 shows a holding portion disposed with being fixed to the connecting pipe 5. A reference numeral 11 designates a holding portion disposed in a handle 13 fixed to the connecting pipe 5. A reference numeral 15 is a case fixed to an intermediate shaft 17 threaded to the rotating shaft 3 by means of a nut 19. Said case 15 comprises a case body 21 and a cover portion 23.

Said cover portion 23, as shown in FIG. 2, is mounted detachably on a bottom surface of the case body 21 through an engaging portion 25, so that the machine is easily disassembled and assembled. On a center portion of the cover portion 23, a guide opening 31 of a pressing member 29 disposed on a lower surface of and integrally with a reel 27 described hereinbelow is formed.

In a space portion 33 defined and constructed by the case body 21 and the cover portion 23, a reel 27 rotatably inserted and fitted into a shaft cylindrical portion 35 and axially slidable is disposed. At a lower portion of this reel 27, there is provided the pressing member 29 protruding downward through the guide hole 31.

On an upper end portion and a center side wall, there are formed franged portions 37, 39 integrally therewith. Between the franged portions 37 and 39, there is formed a groove portion 41 for winding therearound and accommodating therein a cutting tape 40.

Between an inner surface of the case body 21 and an inner wall of the pressing member 19, there is inserted a resilient means 43 such as a spring energizing the pressing member 19 and the reel 27 constantly downward from the case body 21.

A reference numeral 45 is a guide hole formed on the outer circumference of the case body 21 through which an end of the cutting tape 40 wound around the groove portion 41 of the reel 27 protrudes.

In a bottom wall portion of the case body 21 and an upper wall surface of the cover portion, there are disposed radially extending reinforcing ribs with a predetermined spacing left, respectively as illustrated in FIGS. 4 and 5. These flanged portions form first engaging portions and second engaging portions of the case body 21 and the cover portion 23.

On an upper surface and a lower surface of the flanged portions 37 and 39 formed on the upper end portion of said reel 27 and a center side wall thereof, there are formed integrally first engaging protrusions 51a and second engaging protrusions 51b at confronting positions respectively and at a predetermined spacing separated which engage with the first engaging portion 47 and the second engaging portion 49 of the case body 21 and the cover portion 23.

Said first and the second engaging protrusions 51a and 51b are constructed in such a manner that they can move freely or pivotally rightward and leftward in recessed portions 47a, 49a between the first engaging portions 47 and the second engaging portions 49. During cutting down operation, the second engaging protrusion 51b of the flanged portion 39 situated in the reel 27 engages with the second engaging portion 49 of the cover portion 23, causing the case body 21 to move integrally therewith.

The first and the second engaging portions 47 and 49 of the reinforcing ribs respectively located in the case body 21 and the cover member 23 are different in phase from each other and have eight in number, respectively which are disposed with an equal interval, however, the number is not always limited to eight but it may be increased or decreased.

Correspondingly to these ribs, the first and the second engaging protrusions 51a and 51b formed in the flanged portions 37, 39 of the reel 27 are disposed, respectively 4 in number at 90° interval in a circumferential direction. Said first and the second engaging protrusions 51a and 51b are placed in the same phase.

Accordingly, the first and the second engaging protrusions 51a and 51b are different from the first and the second engaging portions 47 and 49 disposed on the case body 21 and the cover member 23 in a point that the phases thereof are different.

Also, the number of the first and the second engaging protrusions 51a and 51b is not limited to four but may be increased or decreased.

In the next place, there will be explained the operation of the present invention comprising the above mentioned construction.

At first, the operator grasps a holding portions 9 and 11, the rotating shaft 3 is rotated through the driving of the engine 7, then the reel 27's second engaging protrusion 51b abuts against and engages with the second engaging portion 47 of the case body 21 to rotate the reel 27 and the case 15 integrally. The condition at this time is illustrated in FIG. 7.

When the case 15 and the reel 27 are rotated, the cutting down tape 40 protruding outward from the guide hole 45 formed in the case body 21 extends out in a radial direction through its centrifugal force to carry out the cutting down work of long weeds and the like.

Then, when an end portion of the cutting down tape is broken and worn and shortened, the case 15 is kept rotated, the pressing member 29 is pressed to the ground surface and the like to release the engaging condition of the reel 27 and the case 15, said pressing member 29 and the reel 27 are rotated upward against a resilient means 43 and moved, while the first engaging protrusion 51a of the flanged portion 37 enters an intermediate position of the first engaging portion 47 of the case body 21 at the same time, further is pulled by the centrifugal force of the cutting down tape 40, to engage the first engaging portion 47 with and abut against the first engaging protrusion 51a.

This condition is illustrated in FIG. 8.

When the pressing member 29 is separated from the ground surface, in such a condition, the reel 27 and the pressing member 29 are moved again downward by the resilient means 43, the first engaging protrusion 51a is disengaged from the first engaging portion 47, while the second engaging protrusion 51b enters a second engaging recessed portion 49a disposed between adjacent second engaging portions 49, and the reel 27 is rotated by being pulled through the centrifugal force of the cutting down tape 40 to abut against and engages with the adjacent next second engaging portion 49.

The cutting down tape can be delivered outward of the case 15 by the distance corresponding to the spacing between the adjacent second engaging portions 49, 49.

In the above mentioned embodiment, the reel portion 27 and the pressing member 29 are disposed integrally, and they may be constructed separately. The vicinity of the outer circumference of the reel 27 indicates at least the distance from a center portion thereof to an outer edge thereof.

FIG. 9 illustrates a second embodiment of the reel 27 of the present invention. In the second embodiment, there are provided the first and the second engaging protrusions 51a, 51b integrally on circumferential edge of the flanged portions 37, 39 of the reel 27 at a predetermined spacing left.

FIG. 10 shows a third embodiment of the reel 27. In this embodiment, on one side of the flanges 37 and 39, and an upper and a lower portions thereof, engaging protrusions 53a, 53b integrally are disposed, which are adopted to be engaged with an engaging portion 55 of the case 15.

Since in accordance with the present invention, there are provided a plurality of engaging portions 47, 49 employed as also reinforcing ribs on an inner wall surface of the case body 21 and the cover member 23, and a plurality of engaging protrusions 51a, 51b engaging with said engaging portions 47, 49 disposed on an upper and a lower surfaces of the flanged portions 37, 39 of the reel 27 accommodated in the case 15, and further the pressing member 29 protrudes on the lower surface of the reel 27, there can be obtained excellent effect hereinbelow.

(1) When the cutting down tape is broken or worn, it can be delivered by a predetermined dimension with easiness, thereby the operating efficiency being enhanced.

(2) The engaging portion of the case and the reel can be disposed in the vicinity of the outer circumference of the reel, so that load applied to the engaging portion can be lowered and the breaking and wearing of the engaging portion be reduced.

(3) Since the engaging portion can be placed in a position near to the outer peripheral portion of the reel, the number of the engaging portion can be increased, the delivery amount of the cutting tape can be decreased, whereby the wasteful consumption of the cutting down tape can be prevented.

The present invention is not limited to the aforementioned embodiments, but may be embodied by another embodiment.

What is claimed is:

1. A cutting down machine comprising:
   a case driven through a rotating shaft by a prime mover which is rotatably supported by a supporting case;
   said case comprising a case body having an inner peripheral surface, a bottom surface, an engaging portion on said bottom surface, and a cover member detachably mounted on said bottom surface;
   a reel provided with a pair of flange portions axially spaced apart to define a groove for winding therearound and accommodating therein a cutting down tape, said flanged portions having an outer periphery in slidable confronting relation with said inner peripheral surface of said case to support the reel for rotation with and slidably disposed in the case and energized downward;
   a number of first and second engaging portions disposed in confronting inner side surfaces of the case;
   a number of first and second engaging protrusions engageable with said first and second engaging portions and placed in the vicinity of the outer peripheral portion of the reel;
   engaging areas of said first and second engaging portions and of said first and second engaging protrusions being situated at an upper and a lower two positions;
   said two engaging areas at the upper and lower portions being provided at different phases in a rotating direction; and
   said reel having a pressing member at a lower portion thereof protruding downward from said cover member of the case.

2. A cutting down machine according to claim 1, wherein one number of said first and second engaging protrusions are formed in the vicinity of the outer circumference of the reel, said second engaging portions are disposed on said cover member; and said one number of engaging protrusions are detachably engaged with a plurality of first and second engaging portions disposed in an inside of the case.

3. A cutting down machine according to claim 1, wherein one first and second engaging portion 47, 49 is formed on an inner side surface of the case 15, and said first and second engaging portion 47, 49 is detachably engaged with a plurality of first and second engaging protrusion 51a, 51b disposed in the vicinity of an outer circumference of reel 27.

4. A cutting down machine according to claim 1, wherein the first and the second engaging portion provided in the vicinity of the outer circumference of the reel 27 is single.

5. A cutting down machine according to claim 1, wherein the first and the second engaging portion 47, 49 disposed on the inner side surface of the case 15 is single.

6. A cutting down machine according to claim 1, wherein the first and the second engaging portion 47, 49 of the case 15 is formed by a suitable number of reinforcing ribs and said reinforcing ribs are detachably engaged with the first and the second engaging protrusions 51a, 51b of the reel 27.

7. A cutting machine according to claim 1, wherein a pressing member 29 disposed in a lower portion of the reel 27 is integrally disposed with said reel 27.

* * * * *

REEXAMINATION CERTIFICATE (2551st)

United States Patent [19]

Itagaki et al.

[11] B1 4,349,962

[45] Certificate Issued May 2, 1995

[54] CUTTING DOWN MACHINE

[75] Inventors: Hidehiko Itagaki, Kasukabe; Yuji Suzuki, Akishima, both of Japan

[73] Assignee: Komatsu Zenoah Co., Higashiyamato, Japan

Reexamination Request:
No. 90/003,440, May 20, 1994

Reexamination Certificate for:
Patent No.: 4,349,962
Issued: Sep. 21, 1992
Appl. No.: 171,789
Filed: Jul. 24, 1980

[30] Foreign Application Priority Data

Jun. 14, 1980 [JP] Japan ................. 55-79620

[51] Int. Cl.$^6$ ................. A01G 3/00; A01D 50/00
[52] U.S. Cl. ................. 30/276; 30/347
[58] Field of Search ........... 30/276, 347; 56/12.7

[56] References Cited

U.S. PATENT DOCUMENTS

| | | | |
|---|---|---|---|
| Re. 32,266 | 10/1986 | Tuggle et al. | 172/15 |
| D. 250,450 | 12/1978 | Tiedemann | D8/8 |
| D. 253,086 | 10/1979 | Hinklin et al. | D8/8 |
| D. 254,173 | 2/1980 | Proulx | D8/8 |
| D. 273,169 | 3/1984 | Rahe et al. | D8/8 |
| 2,709,323 | 5/1955 | Swan | 51/335 |
| 2,771,721 | 11/1956 | Reiman | 51/335 |
| 2,854,798 | 10/1958 | De Haven | 51/335 |
| 3,664,102 | 5/1972 | Reber | 56/295 |
| 3,708,967 | 1/1973 | Geist et al. | 56/12.7 |
| 3,826,068 | 7/1974 | Ballas et al. | 56/12.7 |
| 3,859,776 | 1/1975 | Ballas et al. | 56/12.7 |
| 3,895,440 | 7/1975 | Pittinger, Jr. | 30/347 |
| 3,928,911 | 12/1975 | Pittinger, Jr. | 30/276 |
| 4,047,299 | 9/1977 | Bair | 30/276 |
| 4,107,901 | 8/1978 | Moore | 56/17.5 |
| 4,134,204 | 1/1979 | Perdue | 30/276 |
| 4,151,646 | 5/1979 | Lane | 30/276 |
| 4,161,820 | 7/1979 | Moore | 30/276 |
| 4,167,812 | 9/1979 | Moore | 30/276 |
| 4,168,572 | 9/1979 | Ewing | 30/276 |
| 4,169,311 | 10/1979 | Evenson et al. | 30/276 |
| 4,183,138 | 1/1980 | Mitchell et al. | 30/276 |
| 4,189,833 | 2/1980 | Kwater | 30/276 |
| 4,194,287 | 3/1980 | Palmieri et al. | 30/276 |
| 4,195,408 | 4/1980 | Palmieri et al. | 30/276 |
| 4,203,212 | 5/1980 | Proulx | 30/276 |
| 4,211,004 | 7/1980 | Woods | 30/276 |
| 4,211,005 | 7/1980 | Woods | 30/276 |
| 4,236,311 | 12/1980 | Mitchell | 30/276 |
| 4,253,238 | 3/1981 | Sheldon | 30/276 |
| 4,271,595 | 6/1981 | Rahe | 30/347 |
| 4,274,201 | 6/1981 | Oberg et al. | 30/276 |
| 4,310,970 | 1/1982 | Evenson et al. | 30/276 |
| 4,364,435 | 12/1982 | Tuggle et al. | 172/15 |
| 4,451,983 | 6/1984 | Johnson et al. | 30/276 |
| 4,524,515 | 6/1985 | Oberg | 30/276 |
| 4,584,771 | 4/1986 | Tillotson | 30/276 |
| 4,707,919 | 11/1987 | Tsuchiya | 30/276 |
| 4,835,867 | 6/1989 | Collins et al. | 30/276 |

FOREIGN PATENT DOCUMENTS

| | | |
|---|---|---|
| 1039513 | 10/1978 | Canada . |
| 1198291 | 12/1985 | Canada . |
| 1199800 | 1/1986 | Canada . |
| 1212552 | 10/1986 | Canada . |
| 2361050 | 3/1978 | France . |
| 2398443 | 2/1979 | France . |
| 1404480 | 8/1975 | United Kingdom . |
| 1521149 | 8/1978 | United Kingdom . |

OTHER PUBLICATIONS

Materials from the 35th Annual National Hardware Show; 6 pages; publication date unknown.

"Big Sickle" Invention Disclosure Document, Woodrow Luick, dated Apr. 1, 1975; 3 pages; publication date unknown.

Canadian Office Action dated Feb. 20, 1981; 1 page; publication date unknown.

United Kingdom Search Report dated Feb. 13, 1981; 1 page; publication date unknown.

French Search Report dated Feb. 12, 1983; 2 pages; publication date unknown.

*Primary Examiner*—Richard K. Seidel

[57] ABSTRACT

Line trimmer apparatus for cutting down weeds or the

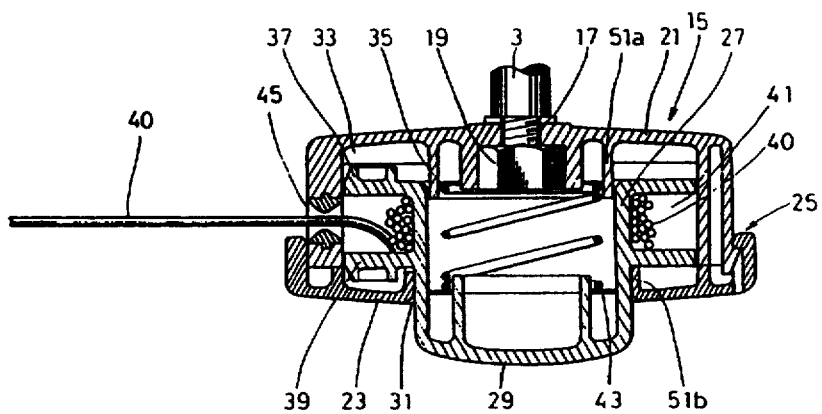

like, incorporating a device for selectably extending a predetermined length of cutting line or tape while the apparatus is operating. The tape is wound on a reel axially and rotatably fitted relative to a drive shaft. Protrusions on the reel mate with either of two sets of engaging portions on a cover portion driven by the drive shaft. The reel is axially urged to a first engaging position by a spring, and has a pressing member which can be placed against the ground to urge the reel axially to a second engaging position. The two sets of engaging portions are angularly offset relative to each other, allowing the protrusions on the reel to rotate relative to the cover portion when axially moved between the engaging positions and thereby unwinding a predetermined length of the cutting tape.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-7 is confirmed.

* * * * *